G. W. McMULLEN.
METHOD OF STABILIZING MILK AND PRODUCT THEREOF.
APPLICATION FILED MAR. 31, 1913.
1,086,385.
Patented Feb. 10, 1914.
2 SHEETS—SHEET 2.
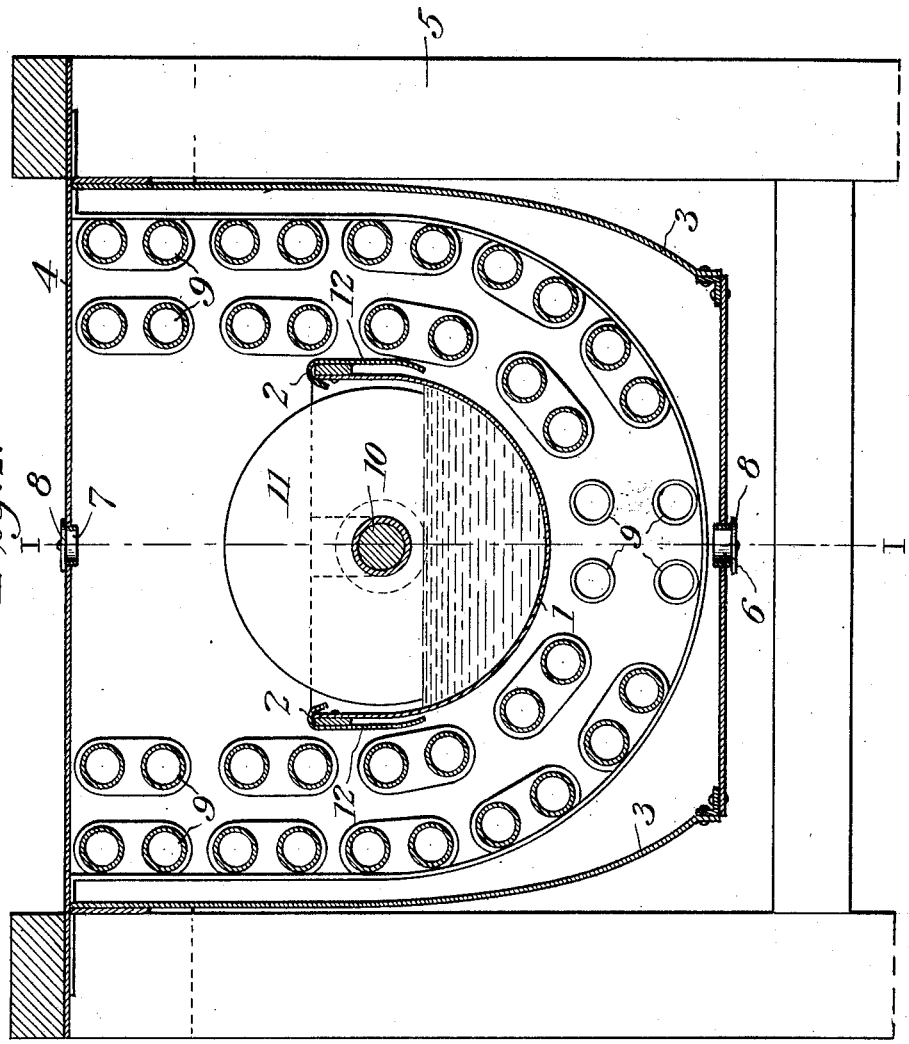
WITNESSES
Fenton S Belt
Robert. I. Hulsizer.
INVENTOR
George W. McMullen
by Byrnes Townsend Bridgestein
Attorneys

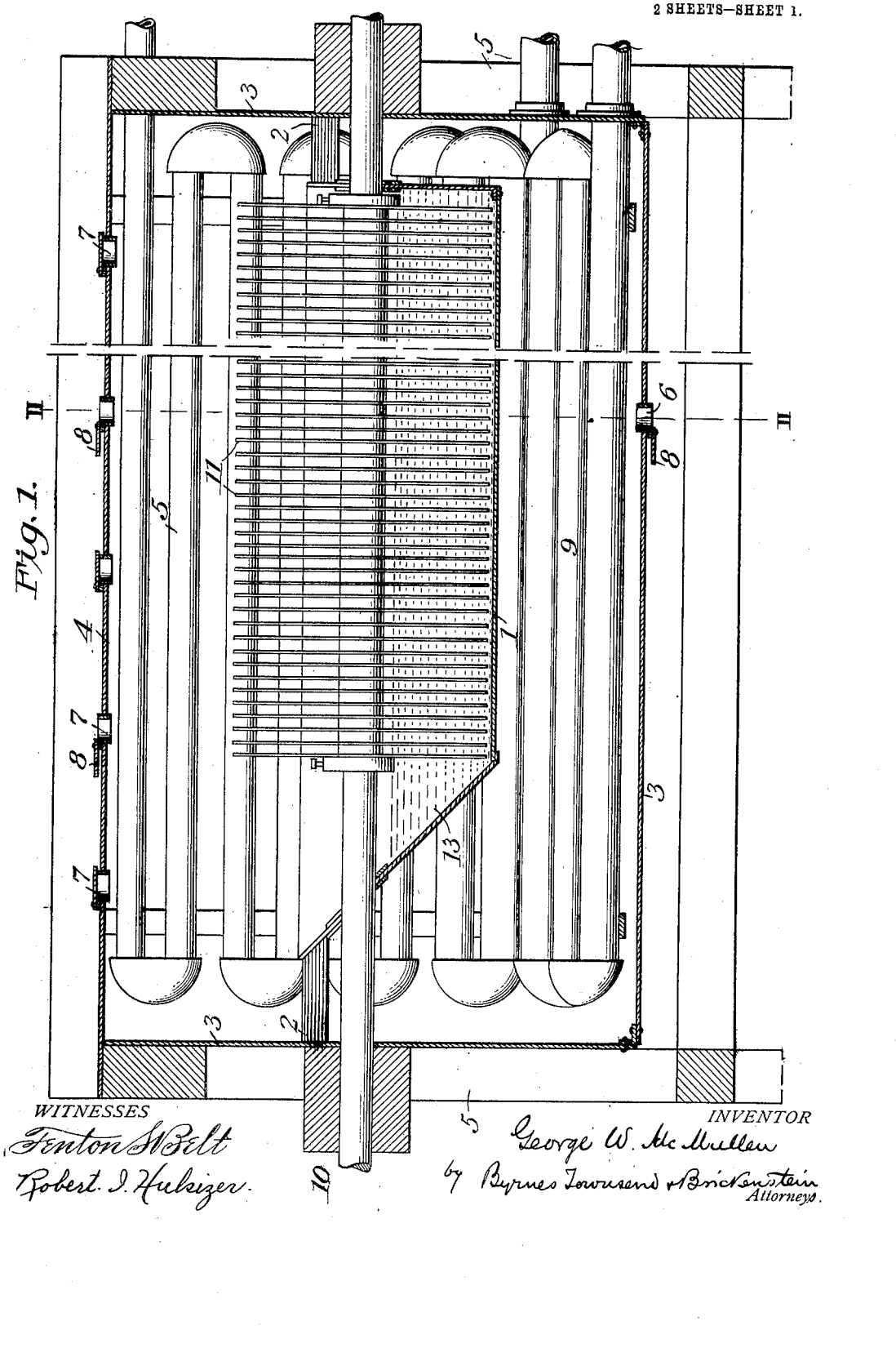

UNITED STATES PATENT OFFICE.

GEORGE W. McMULLEN, OF PICTON, ONTARIO, CANADA.

METHOD OF STABILIZING MILK AND PRODUCT THEREOF.

1,086,385.  Specification of Letters Patent.  Patented Feb. 10, 1914.

Application filed March 31, 1913. Serial No. 757,919.

*To all whom it may concern:*

Be it known that I, GEORGE W. McMULLEN, a citizen of the United States, residing at Picton, Province of Ontario, Canada, have invented certain new and useful Improvements in Methods of Stabilizing Milk and Product Thereof, of which the following is a specification.

This invention relates to methods of treating milk, and to the products thereby formed, the primary object of the invention being the conversion of milk, without alteration of its essential or normal qualities and without the addition of any foreign substance or material, into a commercially stable form, that is to say, into a form in which it is capable of enduring exposure to air for a considerable period, as several days, without appreciable deterioration.

I have found that living organisms which are always present in commercial fresh milk and which, by their growth and multiplication, quickly bring about the deterioration of such milk, may, under certain conditions as hereinafter defined, be destroyed or rendered inactive at temperatures below that at which there occurs any appreciable coagulation of the milk proteids, or any appreciable modification or alteration of the milk, affecting its essential qualities with respect to taste, digestibility or nutritive value. These results I obtain by subjecting the milk for a period approximating one hour to a temperature below that at which the milk proteids are coagulated, that is to say, below 140° F., but sufficiently high to practically destroy all the bacteria of a disease or putrefaction-producing character without completely destroying the lactic acid bacteria. When temperatures of 140° F. and over are used as in pasteurization or sterilization, the milk undergoes more or less profound changes, which it is the purpose of the present invention to avoid. For example, at such higher temperatures, there occurs a coagulation of proteid matters and perhaps other physical or chemical modifications of the milk solids with the result that the treated milk is unsuited for the manufacture of cheese by the usual methods. Further, the ultimate deterioration of milk so treated is found in many cases at least to be putrefactive in character, as distinguished from souring by lactic acid fermentation, indicating that at temperatures above 140° F., a practically complete destruction of the lactic acid bacilli of the fresh milk is accomplished. Results similar to the foregoing are also found to follow a too prolonged exposure at temperatures somewhat below 140°.

It is generally understood that coagulation of albuminoids begins at about 60° C. or 140° F. To successfully operate my invention it is not necessary to heat the milk to so high a temperature, as I have found preferable results at temperatures considerably lower. I have proved that a lengthened treatment at a lower temperature will produce practically the same low bacteria count as a shorter treatment at a higher temperature. The temperature must be above the thermal death point of the bacteria to be eliminated and the time of treatment should not be lengthened beyond what is reasonable and economical in a commercial process.

Milk treated in accordance with the present invention shows no coagulation of proteids or other appreciable physical or chemical modifications of the normal milk solids, is perfectly adapted for the manufacture of butter and cheese, undergoes ultimately a normal lactic fermentation, and, in general, exhibits the normal properties of fresh milk, while possessing in addition to these normal properties, a degree of stability which enables it to be preserved at ordinary temperatures and with special precautionary methods for several days. I have found that these results can be obtained by heating milk for a period of about forty-five or fifty minutes, at a temperature well below 140° F., that is, at from 130° to 135° F., and that by such treatment, the objectionable bacteria-content of the milk has been reduced to a very minute percentage of that in the raw milk, while not all the lactic acid bacteria have been destroyed. The bacterial growth in milk thus treated appears to remain practically stationary for several days, after which the growth recommences, but some days elapse before the bacteria count reaches that of the fresh milk before treatment; and when the milk finally sours and curdles, it develops the natural healthy lactic acid curd without putrefaction.

I have obtained the most favorable results by carrying out the process under such conditions that the milk is heated in an atmosphere as nearly as practicable saturated with respect to moisture, although my invention is not limited to such procedure.

Reference is made to the accompanying drawings, illustrating a preferred form of apparatus, it being understood, however, that the use of apparatus such as is herein described, is not essential for carrying out the invention.

In said drawings—Figure 1 is a central longitudinal section of the apparatus, showing the rotary disks in elevation, parts being broken away; and Fig. 2 is a transverse section of the same on line II—II of Fig. 1.

In said drawings, 1 indicates a semi-cylindrical trough or receptacle, supported by side-bars 2 within an outer casing 3 which is provided with a cover 4. The whole is carried by any suitable framework 5. As illustrated, the casing 3 is provided with a bottom port 6 and with a series of cover ports 7, any or all of which may be provided with removable covers 8. Between the trough 1 and the casing 3 is a series of closed steam-coils 9 by means of which the temperature of the contents of the trough 1 may be accurately controlled. A shaft 10 extends longitudinally through the trough and casing, and has rigidly mounted thereon, in said trough, a series of vertical, closely-spaced disks 11. A movement of rotation may be imparted to the shaft 10 by any suitable means, with the result that a film of milk will be carried upwardly and thereby exposed to the substantially saturated atmosphere within the casing.

12, 12 represent baffles lying between the steam-pipes and the unimmersed portion of the trough, in order to prevent overheating of these surfaces with consequent injury to any milk which may be deposited thereon.

13 represents a liquid well from which the treated milk may be siphoned off or otherwise withdrawn at the close of the operation.

The operation may be successfully practised as follows:—Commercial fresh milk, preferably brought up to a temperature of about 130° in a preheating device, is introduced into the trough or receptacle 1, and the disks 11 set in motion at a speed of 45 to 60 revolutions per minute, or at such higher or lower rate, having due regard to the diameter of the disks, as may safely be employed without danger of separation of fat. Steam is admitted to the coils 9, and preferably the ports 7 in the cover, or certain of them, are closed, the conditions being so adjusted as to maintain a temperature in the milk preferably of from 130–132°, or not greatly exceeding 135° F., and a degree of humidity in the interspaces between the disks 11 in excess of 85 per cent., and preferably in excess of 90 per cent. Such conditions are maintained for about one hour or less, or until the milk has acquired the required degree of stability, as above defined.

As examples of the operation of my process, the following results were obtained by treating the milk for 45 minutes at 130° F.:—

Sample No. 1: Morning milking treated at 10 a. m. Fresh milk 300,000 bacteria per cc. Treated milk 2,000 and 2,200 bacteria per cc.

Sample No. 2: Morning milking treated at 8 a. m. Fresh milk 27,500 bacteria per cc. Treated milk 300 and 400 bacteria per cc.

Sample No. 3: Mixed night and morning milking from cheese factory. Fresh milk 4,000,000 bacteria per cc. Treated milk 5,000 and 5,400 bacteria per cc.

All these samples remained practically stationary as regards bacteria count for three days. Sample No. 3 was transported in a railway car for twelve hours and was then kept at a temperature of from 48 to 55° F. At the end of thirteen days it was sweet and normal with a bacterial count of a little over 500,000 per cc. The other samples showed equally good results.

It is to be understood that the principal factors affecting the treatment, to wit, the temperature of the milk, the time of treatment, and the degree of saturation of the atmosphere adjacent the exposed surfaces of the milk, may be varied within certain limits and with proper correlation. Thus the time of treatment for sterilization is determined with respect to the stability of the product, milk which will endure exposure to air for three to five days without material increase in acidity being deemed commercially stable within the meaning of this application. The temperature of the milk during treatment should in no case be sufficiently high to effect coagulation of the milk proteids within the time required for commercial stabilization. Temperatures of 135° F. or slightly higher have been found to be safe in this respect; slightly lower temperatures, as 130–132° F., are in most cases preferred as yielding the most satisfactory results as regards stabilization without danger of affecting the condition or character of the normal milk solids. The temperature should be sufficiently high to maintain the necessary degree of saturation of the air in contact with the exposed surfaces of the milk. With respect to this degree of saturation, percentages of 90 per cent. or over of complete saturation for the particular temperature employed have been found best in practice, and in general the results are more perfect as the degree of saturation is higher. Saturation somewhat below 90 per cent may however be practicable, under suitable conditions as to temperature and time of treatment.

Milk treated as above described possesses substantially the flavor, taste and consistence of normal milk, remains sweet and wholesome for a period amply sufficient for its distribution to and utilization by consumers at localities far removed from the center of production and treatment.

Very rapid evaporation is inconsistent with effective stabilization of the milk in accordance with this invention, since such rapid evaporation necessarily involves the use of large volumes of unsaturated air or gas. It is however often desirable in practice to concentrate the milk to a greater or less degree and such concentration is readily and economically effected, after the milk has been properly stabilized, by increasing the volume of air, as by opening the ports 6, 7, or by otherwise causing a current of air to flow in contact with the exposed surfaces of the milk. This phase of the treatment need not differ essentially from milk-evaporation as heretofore practised, it being necessary only that the temperature of the milk should be maintained throughout the treatment below that temperature at which any coagulation by heat of the milk proteids occurs. Temperatures of 135° F. or slightly higher are satisfactory. The final product may be either a thickened liquid or a homogeneous, semi-solid mass having a consistence similar to that of butter or of green cheese, but differing fundamentally from these in that it contains the normal milk solids in the same relations in which they exist in the normal milk. For instance by concentrating the milk to slightly less than 20 per cent. of its original bulk, or by evaporating about 80 pounds of water from each 100 pounds of original milk, a palatable, readily-digestible and commercially sterile product is obtained.

The process is equally applicable to fresh milk and to skimmed milk, with a corresponding difference in the composition of the product. Also, the milk, after having been stabilized in the manner described, may be treated as usual for the separation of cream, and either or both of the separated stabilized products may then undergo further concentration.

I believe myself to be the first to effect the stabilization or commercial sterilization of milk, without foreign agencies, by treatment for a sufficient but not excessive time at a temperature, so low as not materially to affect the proteids or other normal milk solids, but above the necessary thermal death point of disease and other bacteria to be eliminated.

In practice, I have in certain cases maintained the practical saturation of the atmosphere in contact with the surface of the milk until the concentration has proceeded as far as desired, even to a semi-solid or buttery consistence. This insures, under all conditions, a stable, safe and highly palatable product; nevertheless, after the material has been stabilized under the described condition of substantial saturation, it is quite practicable to effect the concentration with a material reduction of the degree of saturation of the surrounding atmosphere, the evaporation being thereby greatly expedited. Further, when milk, properly agitated, as by the use of the above apparatus, is subjected for from 45 to 50 minutes to a temperature of about 131° F., all typhoid and tuberculosis bacteria are either destroyed or rendered innocuous, so that my method is also effective against these disease bacteria, if present. I have further found that cream taken from milk treated according to the methods above described, by ordinary separation, will keep sweet for practically the same length of time as the whole milk under similar conditions, and that the cream treated at this temperature is unchanged in character, giving the possibility of maintaining cream in its sweet natural state for from a week to ten days at temperatures of from 48° to 55° F. It will be understood therefore that by the term "milk," as used in the claims, is meant either whole milk or skimmed milk, concentrated or unconcentrated, or cream.

I claim:

1. The method of preparing stabilized normal milk, which consists in heating milk to a temperature below 140° Fahrenheit, the treatment being sufficiently prolonged and under proper conditions to effect the commercial stabilization of the milk without coagulation of the milk proteids.

2. The herein-described method of stabilizing milk, which consists in exposing the same at a temperature below that at which coagulation of the milk proteids occurs, to an atmosphere substantially saturated with aqueous vapor, the exposure being sufficiently prolonged to accomplish the commercial stabilization of the milk.

3. The method of preparing stabilized normal milk, which consists in heating milk to a temperature below 140° Fahrenheit, the the treatment being sufficiently prolonged and under proper conditions to effect the commercial stabilization of the milk without coagulation of the milk proteids, and thereafter separating the cream from the milk, whereby two commercially stable products are produced.

4. The herein-described method of stabilizing milk, which consists in exposing the same at a temperature approximating but below that at which coagulation of the milk proteids occurs, to an atmosphere substantially saturated with aqueous vapor, the exposure being sufficiently prolonged to accomplish the commercial stabilization of the milk, and thereafter separating the cream from the milk, whereby two commercially stable products are produced.

5. As a new article of manufacture, milk in a commercially stable condition, capable of withstanding exposure for several days without material change, free from antiseptic substances, containing the normal milk solids unaltered in physical or chemical condition, possessing practically the taste and flavor of fresh milk and adapted for the preparation of butter or cheese by usual methods.

6. As a new article of manufacture, milk in a commercially stable condition, capable of withstanding exposure for several days without material change, free from antiseptic substances, containing the normal milk solids unaltered in physical or chemical condition, possessing the taste, flavor and consistence of fresh milk and adapted for the preparation of butter or cheese by usual methods.

7. As a new article of manufacture, milk in a commercially stable condition, capable of withstanding exposure for several days without material change, free from antiseptic substances, but containing lactic acid bacteria, having the normal milk solids unaltered in physical or chemical condition, possessing practically the taste and flavor of fresh milk and adapted for the preparation of butter or cheese by usual methods.

8. The method of preparing stabilized normal milk, which consists in heating milk to a temperature below 140° Fahrenheit and below that at which all the lactic acid bacteria contained in the milk will be destroyed, the treatment being sufficiently prolonged and under proper conditions to effect the stabilization of the milk without coagulation of the milk proteids.

In testimony whereof I affix my signature in presence of two witnesses.

GEORGE W. McMULLEN.

Witnesses:
H. C. McMULLEN,
G. B. McMULLEN.

---

Copies of this patent may be obtained for five cents each, by addressing the "Commissioner of Patents, Washington, D. C."